(12) United States Patent
Schaefer et al.

(10) Patent No.: US 6,743,407 B2
(45) Date of Patent: Jun. 1, 2004

(54) HYDROGEN CYANIDE SYNTHESIS PROCESS

(75) Inventors: Thomas Schaefer, Buettelborn (DE); Hermann Siegert, Seeheim-Jugenheim (DE)

(73) Assignee: Roehm GmbH & Co. KG, Darmstadt (DE)

( * ) Notice: Subject to any disclaimer, the term of this patent is extended or adjusted under 35 U.S.C. 154(b) by 73 days.

(21) Appl. No.: 09/903,777

(22) Filed: Jul. 13, 2001

(65) Prior Publication Data

US 2002/0054848 A1 May 9, 2002

(30) Foreign Application Priority Data

Jul. 13, 2000 (DE) .......... 100 34 194

(51) Int. Cl.[7] .............. C01C 3/02
(52) U.S. Cl. .............. 423/376
(58) Field of Search .............. 423/376

(56) References Cited

U.S. PATENT DOCUMENTS

| 3,379,500 A | 4/1968 | Albanese et al. | 423/376 |
| 5,882,618 A | 3/1999 | Bhatia et al. | 423/376 |

FOREIGN PATENT DOCUMENTS

| DE | 549 055 | 4/1932 |
| DE | 1 288 575 | 2/1969 |
| DE | 1 283 209 | 7/1969 |
| GB | 1120401 | 7/1968 |
| WO | WO 97/09273 | 3/1997 |

Primary Examiner—Stanley S. Silverman
Assistant Examiner—Maribel Medina
(74) Attorney, Agent, or Firm—Oblon, Spivak, McClelland, Maier & Neustadt, P.C.

(57) ABSTRACT

A process for the production of hydrogen cyanide is provided, wherein hydrogen cyanide is synthesized by reacting methane or methane-containing natural gas, ammonia and oxygen-enriched air or oxygen in the presence of a catalyst comprising platinum or a platinum alloy; wherein the reactants are present in the following molar ratios $$\frac{[O_2]}{[O_2 + N_2]} = 0.25 \text{ to } 1.0;$$

$$\frac{[CH_4]}{[NH_3]} = 0.95 \text{ to } 1.05; \text{ and}$$

where a molar ratio of ammonia to the sum of oxygen and nitrogen obeys the following relationship:

$$Y = m \cdot X - a,$$

wherein $$Y = \frac{[NH_3]}{[O_2 + N_2]}$$

$$X = \frac{[O_2]}{[O_2 + N_2]}$$

m=1.25 to 1.40; and a 0.05 to 0.14.

7 Claims, 1 Drawing Sheet

HYDROGEN CYANIDE SYNTHESIS PROCESS

BACKGROUND OF THE INVENTION

1. Field of the Invention

The invention relates to a process for the synthesis of hydrogen cyanide using a starting-gas stream containing methane or a methane-containing natural-gas stream, ammonia and oxygen.

2. Discussion of the Background

The synthesis of hydrogen cyanide (prussic acid; hydrocyanic acid) by the Andrussow method is described in Ullmann's Encyclopedia of Industrial Chemistry, Volume 8, VCH Verlagsgesellschaft, Weinheim, 1987, pp. 161–162. The starting-gas mixture, which comprises methane or a methane-containing natural-gas stream, ammonia and oxygen is passed into a reactor over catalyst gauze and reacted at temperatures of about 1000° C. The necessary oxygen is usually introduced in the form of air. The catalyst gauzes comprise platinum or platinum alloys. The composition of the starting-gas mixture corresponds approximately to the stoichiometry of the overall equation of the exothermic reaction $$CH_4 + NH_3 + 3/2\ O_2 \rightarrow HCN + 3\ H_2O\ \ dHr = -473.9\ kJ.$$

The discharged reaction gas contains the product HCN, unreacted $NH_3$ and $CH_4$, the main by-products CO, $H_2$, $H_2O$ and $CO_2$, and a large proportion of $N_2$.

The reaction gas is cooled rapidly to about 150 to 200° C. in a waste-heat boiler and then passed through a scrubbing column, in which the unreacted $NH_3$ is removed with dilute sulfuric acid and some of the water vapor is condensed. Also known is the absorption of $NH_3$ with sodium hydrogen phosphate solution followed by recycling of the ammonia. HCN is absorbed in cold water in a subsequent absorption column and then purified to better than 99.5 wt % in a downstream rectification unit. The HCN-containing water present in the column bottoms is cooled and recycled to the HCN absorption column.

A broad spectrum of possible embodiments of the Andrussow method is described in German Patent 549055. In one example, a catalyst comprising a plurality of fine-mesh gauzes of Pt with 10% rhodium disposed in series is used at temperatures of about 980 to 1050° C. The HCN yield is 66.1 % relative to the feed $NH_3$.

A method for maximizing the HCN yield by optimal adjustment of the air/natural gas and air/ammonia ratios is described in U.S. Pat. No. 4,128,622.

In addition to the standard operating procedure with air as the oxygen supply, the use of oxygen-enriched air is described in various documents such as: German Patent 1283209, which corresponds to Netherlands Patent 6604519, Belgian Patent 679440 and U.S. Pat. No. 3,379,500; German Examined Application 1288575, which corresponds to Netherlands Patent 6604697 and Belgian Patent 679529; International Patent WO 97/09273; and U.S. Pat. No. 5,882,618. Table 1 lists some patents with the operating conditions cited therein.

TABLE 1

| corresponds to | German Patent 1283209, 1968, Società Edison Netherlands Patent 6604519, Belgian Patent 679440 U.S. Pat. No. 3379500 (italics) | German Examined Application 1288575, 1968, Societa Edison Netherlands Patent 6604697, Belgian Patent 679529 | International Patent WO 97/09273, 1997, ICI special reactor | U.S. Pat. No. 5882618, 1999, Air Liquide |
|---|---|---|---|---|
| Starting-gas preheating | — | 200 to 400° C. 300 to 380° C. | 200 to 400° C. further temperature data for individual starting-gas streams | |
| Gauze temperature | 1100 to 1200° C. | 1100 to 1200° C. | | 1100 ± 50° C. |
| $(O_2 + N_2)/CH_4$ molar ration | 6.5 to 1.55 4.55 to 2.80 | 6.0 to 1.6 4.5 to 2.6 | | Ratios reported as relative to the mode of operation with air |
| $(O_2 + N_2)/NH_3$ | 6.8 to 2.0 4.8 to 3.65 | 6.0 to 2.0 4.5 to 3.0 | | |
| $CH_4/NH_3$ | 1.4 to 1.05 1.3 to 1.1 | 1.3 to 1.0 1.25 to 1.05 | 1.0 to 1.5 | |
| $O_2/(O_2 + N_2)$ | 0.245 to 0.4 0.27 to 0.317 | 0.245 to 0.35 0.25 to 0.30 | 0.3 to 1.0 | |

U.S. Pat. No. 5,882,618 describes the synthesis of hydrocyanic acid by the Andrussow method using oxygen-enriched air. To circumvent the problems that occur under these conditions, such as proximity to the explosion limits of the mixture of $NH_3$, $CH_4$ and oxygen-enriched air, as well as the elevated temperature of the catalyst gauze, which can lead to yield losses and shortened catalyst life, the following measures are proposed:

In a first process step, the system is started up with air as the oxygen source. During this first process step, the catalyst mesh reaches a well-defined temperature.

In a second process step, oxygen is then added and at the same time the contents of ammonia and methane are adjusted such that the mixture is situated above the upper explosion limit and the catalyst temperature corresponds to within 50 K of the reference temperature determined in step 1. The temperature of the catalyst gauze is about 1100° C. to 1200° C. By means of this procedure, safe use of the system is achieved during operation with oxygen-enriched air.

International Patent WO 97/09273 overcomes the disadvantages of high $N_2$ dilution of the reaction gases by the use of preheated, mixtures of methane, ammonia and oxygen-enriched air or pure oxygen capable of detonation.

The enrichment with oxygen of the starting gas for HCN synthesis according to Andrussow, described heretofore, has the following disadvantages:

proximity to the upper explosion limit of the starting gas mixture (danger of explosions, deflagrations and local temperature spikes, resulting in damage to the catalyst gauze);

low yield relative to $NH_3$;

higher catalyst temperature and faster deactivation;

maximum $O_2$ enrichment in the standard Andrussow reaction is up to 40% $O_2$ in air;

high investment and maintenance costs for the use of special reactors (International Patent WO 97/09273).

The advantages of enriching the starting-gas stream with oxygen are essentially the following:

increased productivity (kg HCN per hour) in existing plants through reduction of the inert gas concentration; and lower energy consumption for HCN absorption and rectification.

By adjusting conditions and concentration ratios in the starting gas to correspond to the solution described in the claims, the advantages of enrichment with oxygen can be achieved without having to tolerate the described disadvantages.

SUMMARY OF THE INVENTION

Thus, it is an object of the present invention to provide a process for synthesis of hydrogen cyanide wherein the starting gas is enriched with oxygen up to a degree of enrichment of $O_2/(O_2+N_2)=1.0$ whereby the inert-gas stream is decreased and the HCN concentration in the reaction gas is increased, and so the productivity of existing plants is increased while at the same time the energy consumed per metric ton of produced HCN is reduced.

It is another object of the present invention to provide a process for synthesis of hydrogen cyanide wherein the HCN yields relative to the feed $NH_3$ are improved.

It is another object of the present invention to provide a process for synthesis of hydrogen cyanide wherein a high catalyst efficiency is achieved. The high catalyst activity refers to HCN production amount per kg of catalyst gauze.

It is yet another object of the present invention to provide a process for synthesis of hydrogen cyanide wherein the reactor is safely operated with a non-ignitable starling-gas mixture.

It is an additional object of the present invention to provide a process for synthesis of hydrogen cyanide which can be performed in existing reactors for the manufacture of hydrocyanic acid. The process can be performed in existing systems for hydrocyanic acid synthesis. Costly modifications are not necessary (Ullmann's Encyclopedia of Industrial Chemistry, 5th Edition, Vol. A8, pp. 159 ff. (1987)). Since the reaction takes place outside the detonation limits of the mixture of ammonia, methane and oxygen or air, complex reactors such as described in International Patent WO 97/09273, FIG. 1, are not necessary. The need to maintain a wide margin of safety for the spontaneous ignition temperature of the mixture (minimum 50° C.), as described in WO 97/09273 (p. 1, line 35 to p. 2, line 2), is also obviated. Thus an improved space-time yield is also achieved in existing systems for hydrocyanic acid synthesis.

This and other objects are achieved according to the present invention, the first embodiment of which includes a process for synthesis of hydrogen cyanide, comprising:

reacting methane or methane-containing natural gas, ammonia and oxygen-enriched air or oxygen in the presence of a catalyst comprising platinum or a platinum alloy;

wherein oxygen and nitrogen are present in a molar ratio which satisfies the relationship $$\frac{[O_2]}{[O_2 + N_2]} = 0.25 \text{ to } 1.0;$$

wherein methane and ammonia are present in a molar ratio of $$\frac{[CH_4]}{[NH_3]} = 0.95 \text{ to } 1.05;$$

wherein a molar ratio of ammonia to the sum of oxygen and nitrogen obeys the following relationship:

$$Y = m \cdot X - a,$$

wherein $$Y = \frac{[NH_3]}{[O_2 + N_2]}$$

$$X = \frac{[O_2]}{[O_2 + N_2]}$$

m=1.25 to 1.40; and a=0.05 to 0.14.

Another embodiment of the present invention includes a process for synthesis of hydrogen cyanide by the Andrussow method, comprising:

reacting a mixture of methane or methane-containing natural gas, ammonia and oxygen-enriched air or oxygen in the presence of a catalyst at an elevated temperature;

wherein a ratio $$\frac{[O_2]}{[O_2 + N_2]} > 0.4 \text{ to } 1.0 \text{ (vol/vol); and}$$

wherein said reacting is performed in a conventional Andrussow reactor.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
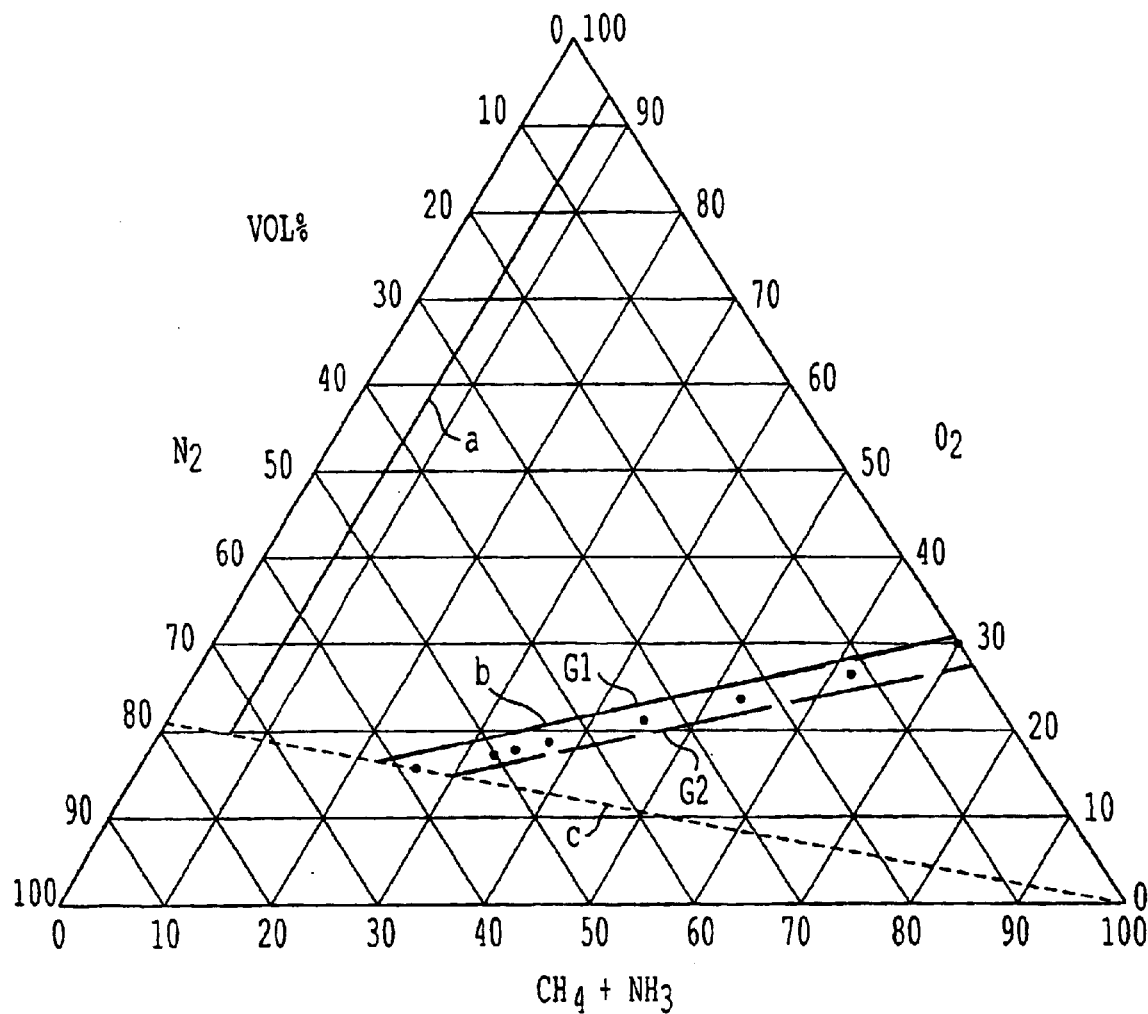
FIG. 1 shows the boundary lines for starting-gas compositions.

The above described advantages are achieved by performing the measures cited hereinafter. In particular, besides the advantages of enrichment with $O_2$, a higher HCN yield relative to the feed $NH_3$ is also surprisingly achieved when the $NH_3/(N_2+O_2)$ molar ratio is adjusted as a function of the $O_2/(O_2+N_2)$ molar ratio according to the formula described hereinafter (see point III).

The term "methane" within the meaning of the present invention refers to a natural gas mixture containing at least 88 vol % of methane.

I. Enrichment of atmospheric air with oxygen.

The air volume flow is mixed with pure oxygen or with a nitrogen-oxygen mixture.
The atmospheric air enriched with oxygen has a molar ratio of $$O_2/(O_2+N_2)=0.25 \text{ to } 0.40.$$

If the added proportion of pure oxygen or nitrogen-oxygen mixture is maintained sufficiently accurately, the enrichment can be taken as far as complete replacement of the air volume flow with pure oxygen ($O_2/(O_2+N_2)$ molar ratio= 0.25 to 1.0).

Further, in a preferred embodiment the process is performed by reacting the mixture of methane or methane-containing natural gas, ammonia and oxygen-enriched air or oxygen in the presence of a catalyst at an elevated temperature in a conventional Andrussow reactor; a wherein a ratio $$\frac{[O_2]}{[O_2+N_2]} > 0.4 \text{ to } 1.0 \text{ (vol/vol).}$$

II. Adjustment of the $CH_4/NH_3$ molar ratio in the starting-gas mixture in the range $CH_4/NH_3=0.95$ to 1.05; preferably in the range $CH_4/NH_3=0.98$ to 1.02.

III. Adjustment of the $NH_3/(O_2+N_2)$ molar ratio in the starting-gas mixture.

The $NH_3/(O_2+N_2)$ molar ratio is adjusted as a function of the $O_2/(O_2+N_2)$ molar ratio. FIG. 1 shows the boundary lines for a starting gas composition wherein a is the lower explosion limit for $NH_3$—$CH_4$ mixture (1:1), b is the upper explosion limit for $NH_3$—$CH_4$ mixture (1:1), c is the line for air-$CH_4$—$NH_3$ mixtures, • are the operating points according to the Examples, G1 is the boundary line Y=mX+a, with m=1.25, a=−0.12, G2 is the boundary line Y=mX+a, with m=1.40, a=−0.08, Y is the $NH_3/(O_2+N_2)$ molar ratio and X is the $O_2/(O_2+N_2)$ molar ratio.

The composition of the starting-gas mixture then lies in a concentration band defined by the following two lines as shown in FIG. 1:

$$Y=1.25X-0.12 \text{ and } Y=1.40X-0.08$$

where:

$Y=NH_3/(O_2+N_2)$ molar ratio
$X=O_2/(O_2+N_2)$ molar ratio

An advantageous molar ratio Y is obtained independently of molar ratio X by inserting the parameters m and a in the linear equation Y=mX−a, so that the parameters lie in the following ranges:

m=1.25 to 1.40 and a=0.05 to 0.14 and especially advantageously in the ranges:

m=1.25 to 1.33 and a=0.07 to 0.11

IV. Limiting the preheating of the starting-gas mixture to at most 150° C.

Having generally described this invention, a further understanding can be obtained by reference to certain specific examples which are provided herein for purposes of illustration only, and are not intended to be limiting unless otherwise specified.

EXAMPLES

The examples described hereinafter were performed in a laboratory apparatus comprising a gas-proportioning unit with thermal mass flow controllers for the starting gases (methane, ammonia, air, oxygen), an electrical heater for preheating the starting gases, a reactor part (inside diameter $d_i$: 25 mm) with 6 layers of a Pt/Rh10 catalyst gauze, and a downstream HCN scrubber for neutralization of the formed HCN with NaOH solution.

The reaction gas was analyzed on-line in a gas chromatograph. To determine the balance of the formed HCN quantity, the $CN^-$ concentration in the discharge of the HCN scrubber was additionally determined by argentometric titration.

In one series of experiments, and starting from a mode of operation corresponding to the known operating conditions with air as oxygen source, atmospheric oxygen was progressively replaced by pure oxygen and at the same time the $O_2/NH_3$ molar ratio was reduced while maintaining the $CH_4/NH_3$ ratio constant. All experiments were performed with a constant starting-gas volume flow of 24 l/min (NTP). Table 1 shows a selection of representative results.

TABLE 1

Experimental results of enrichment with $O_2$ in the starting gas
($d_i$: 25 mm, starting-gas volume flow $V^1{}_F$: 24 Nl/min, starting-gas temperature $T_F$: 60° C.)

| No. | $O_2/(O_2+N_2)$ molar ratio [1) X] | $NH_3/(O_2+N_2)$ molar ratio Y | Parameters in Y = mX − a a | m | Gauze temp. $T_N$ ° C. | HCN conc. in reaction gas % vol % | Spec. reactor efficiency $L_{spec}$ kg HCN/ h/m² | Yield $A_{HCN}$ % |
|---|---|---|---|---|---|---|---|---|
| 1 | 0.21 2) | 0.182 | 0.080 | 1.25 | 994 | 7.6 | 303 | 62.9 |
| 2 | 0.259 | 0.255 | 0.074 | 1.27 | 1011 | 9.1 | 380 | 62.4 |
| 3 | 0.300 | 0.307 | 0.083 | 1.30 | 1022 | 10.1 | 442 | 64.5 |
| 4 | 0.393 | 0.426 | 0.080 | 1.29 | 1032 | 12.0 | 542 | 65.6 |
| 5 | 0.516 | 0.590 | 0.097 | 1.33 | 1034 | 13.7 | 650 | 66.3 |

TABLE 1-continued

Experimental results of enrichment with $O_2$ in the starting gas ($d_i$: 25 mm, starting-gas volume flow $V^1_F$: 24 Nl/min, starting-gas temperature $T_F$: 60° C.)

| No. | $O_2/(O_2+N_2)$ molar ratio [1] X | $NH_3/(O_2+N_2)$ molar ratio Y | Parameters in $Y = mX - a$ a | m | Gauze temp. $T_N$ ° C. | HCN conc. in reaction gas % vol % | Spec. reactor efficiency $L_{spec}$ kg HCN/ h/m² | Yield $A_{HCN}$ % |
|---|---|---|---|---|---|---|---|---|
| 6 | 0.714 | 0.826 | 0.082 | 1.27 | 1010 | 14.6 | 750 | 66.8 |
| 7 | 1.00 [3] | 1.185 | 0.075 | 1.26 | defective | 16.7 | 863 | 68.0 |

[1] $O_2$ content in the oxygen-air mixture,
[2] only atmospheric oxygen,
[3] operation with pure oxygen without air.

At constant gas volume flow, the specific reactor efficiency (HCN production quantity in kg/(h*²m) per unit of cross-sectional area of the catalyst gauze) increased from about 300 kg HCN/h/m² (oxidizing agent exclusively atmosphere air) to about 860 kg HCN/h/m² during operation with pure oxygen as the oxidizing agent. The HCN yield relative to feed ammonia, $A_{HCN,NH3}$, improved from 63% to 68%. The HCN concentration in the reaction gas increased from 7.6 vol % to 16.7 vol % with decrease of the nitrogen content in the starting gas.

The priority document of the present application, German patent application 100 34 194.2, filed Jul. 13, 2000, is incorporated herein by reference.

Obviously, numerous modifications and variations on the present invention are possible in light of the above teachings. It is therefore to be understood that within the scope of the appended claims, the invention may be practiced otherwise than as specifically described herein.

What is claimed is:

1. A process for the synthesis of hydrogen cyanide, comprising:
   reacting methane or methane-containing natural gas, ammonia and oxygen-enriched air or oxygen in the presence of a catalyst comprising platinum or a platinum alloy;
   wherein oxygen and nitrogen are present in a molar ratio which satisfies the following relationship:

$$\frac{[O_2]}{[O_2+N_2]} = 0.25 \text{ to } 1.0;$$

wherein methane and ammonia are present in a molar ratio of $$\frac{[CH_4]}{[NH_3]} = 0.98 \text{ to } 1.02;$$

and wherein a molar ratio of ammonia to the sum of oxygen and nitrogen satisfies the following relationship:

$$Y = m \cdot X - a,$$

wherein $$Y = \frac{[NH_3]}{[O_2+N_2]}$$

$$X = \frac{[O_2]}{[O_2+N_2]}$$

m=1.25 to 1.40; and
   a=0.05 to 0.14.

2. The process according to claim 1, wherein said molar ratio of oxygen and nitrogen is $$\frac{[O_2]}{[O_2+N_2]} = 0.25 \text{ to } 1.40.$$

3. The process according to claim 1, wherein m=1.25 to 1.33 and a=0.07 to 0.11.

4. The process according to claim 1, wherein the starting-gas mixture is preheated to at most 150° C.

5. The process according to claim 1, wherein a volume flow for ammonia and methane or the methane-containing natural gas is calculated and controlled as a function of a molar ratio $X=O_2/(N_2+O_2)$ using a process control system.

6. The process according to claim 1, wherein said process is performed in a conventional Andrussow-reactor.

7. The process according to claim 1, wherein said methane-containing mixture gas contains at least 88 vol. % of methanes.

* * * * *